United States Patent [19]
Järvinen et al.

[11] Patent Number: 5,862,178
[45] Date of Patent: Jan. 19, 1999

[54] METHOD AND APPARATUS FOR SPEECH TRANSMISSION IN A MOBILE COMMUNICATIONS SYSTEM

[75] Inventors: Kari Järvinen; Janne Vainio; Petri Haavisto, all of Tampere, Finland

[73] Assignee: Nokia Telecommunications OY, Espoo, Finland

[21] Appl. No.: 612,934

[22] PCT Filed: Jul. 5, 1995

[86] PCT No.: PCT/FI95/00390

§ 371 Date: Jun. 20, 1996

§ 102(e) Date: Jun. 20, 1996

[87] PCT Pub. No.: WO96/02091

PCT Pub. Date: Jan. 25, 1996

[30] Foreign Application Priority Data

Jul. 11, 1994 [FI] Finland ..................................... 943302

[51] Int. Cl.$^6$ .................................................. H04B 1/66
[52] U.S. Cl. .......................... 375/240; 375/262; 704/201; 704/501
[58] Field of Search .................................... 375/240, 262, 375/341, 265; 371/37.4; 704/201, 227, 228, 500, 501

[56] References Cited

U.S. PATENT DOCUMENTS

| | | |
|---|---|---|
| 5,115,469 | 5/1992 | Taniguchi et al. . |
| 5,271,089 | 12/1993 | Ozawa . |
| 5,511,096 | 4/1996 | Huang et al. ............................ 375/265 |
| 5,657,333 | 8/1997 | Ikekawa ................................. 371/37.4 |
| 5,684,893 | 11/1997 | Shikakura .............................. 371/37.4 |

FOREIGN PATENT DOCUMENTS

| | | |
|---|---|---|
| 0 570 171 | 11/1993 | European Pat. Off. . |
| 0 588 307 | 3/1994 | European Pat. Off. . |
| 0 634 840 | 1/1995 | European Pat. Off. . |

*Primary Examiner*—Don N. Vo
*Attorney, Agent, or Firm*—Pillsbury Madison & Sutro LLP

[57] ABSTRACT

A method and apparatus for speech transmission in a telecommunications system in which a speech signal is compressed to a small number of speech coding bits by a speech coding method, and the speech coding bits are subjected to channel coding. Several different speech coding methods, which may all operate at different transmission rates, are involved in the speech transmission. The method is based on the use of two-stage channel coding. The first channel coding is dependent on the speech coding method, and it is performed in connection with the speech coding in such a manner that the total transmission rate provided by the speech coding and the first channel coding is always constant irrespective of the speech coding method. The second channel coding performed thereafter is always exactly the same regardless of the speech coding method and the first channel coding method, and it is used with all speech coding methods. The second channel coding may be, for example, the original channel coding in an existing telecommunications system.

14 Claims, 2 Drawing Sheets

METHOD AND APPARATUS FOR SPEECH TRANSMISSION IN A MOBILE COMMUNICATIONS SYSTEM

This application claims benefit of international application PCT/ Fl 95/00390 filed Jul. 5, 1995.

FIELD OF THE INVENTION

The invention relates to a method for speech transmission in a mobile communications system, the method comprising compressing a speech signal to a small number of speech coding bits by a speech coding method, and channel encoding the speech coding bits.

BACKGROUND OF THE INVENTION

In telecommunications systems transmitting digital speech, a speech signal is usually subjected to two coding operations: speech coding and channel coding.

Speech coding comprises speech encoding performed in the transmitter by a speech encoder and speech decoding performed in the receiver by a speech decoder. The speech encoder in the transmitter compresses a speech signal so that the number of bits used for representing the speech signal per a unit of time is reduced, whereby less transmission capacity is required for transmitting the speech signal. The speech decoder in the receiver performs a reverse operation and synthesizes the speech signal from the bits generated by the speech encoder. However, the speech synthesized in the receiver is not identical with the original speech compressed by the speech encoder; the original speech has changed more or less as a result of the speech coding. In general, the more the speech is compressed in the speech coding, the more its quality deteriorates during the coding. In the pan-European GSM mobile communication system (Global System for Mobile Communication), for example, the speech encoder of a full-rate traffic channel compresses a speech signal to a transmission rate of 13 kbit/s. The speech synthesized by the corresponding speech decoder is clearly of a poorer quality than the speech transmitted by, for instance, a public switched telephone network (PSTN).

Thus, when a speech coding method is selected, a compromise must be made between the quality offered by the method and the transmission capacity required by it. Another factor to be considered in the selection is the complexity of the implementation of the speech coding method: the quality of speech can usually be improved without increasing the transmission rate if higher requirements for the method as regards calculation capacity and thereby also higher costs of the implementation are allowed. On account of the continuous development of speech coding methods and the implementation techniques, more and more advanced methods are available for speech transmission in the existing telecommunications systems. After the development of the method employed in the GSM, speech coding technology has advanced to such an extent that, as compared with the above-mentioned 13 kbit/s speech coding method, a higher quality of speech can now be achieved at a much lower transmission rate, e.g. 8 kbit/s.

Channel coding comprises channel encoding performed in the transmitter by a channel encoder, and channel decoding performed in the receiver by a channel decoder. The purpose of channel coding is to protect speech coding bits to be transmitted against errors occurring in the transmission channel. Channel coding can either be used for merely detecting whether the transmission has caused any errors in the speech coding bits without any possibility of correcting them, or it may be capable of correcting errors caused by the transmission, provided that the number of errors does not exceed a given maximum, which is dependent on the channel coding method.

The selection of the channel coding method employed depends on the quality of the transmission channel. In fixed transmission networks the probability of errors is often very low, wherefore not much channel coding is required, whereas in wireless networks such as mobile telephone networks the probability of errors in the transmission channels is often very high, and the channel coding method employed has a significant effect on the resulting quality of speech. Mobile telephone networks usually employ both error-detecting and error-correcting channel coding methods concurrently.

Channel coding is based on the use of error check bits, also called channel coding bits, added to the speech encoding bits. Bits produced by the speech encoder of the transmitter are supplied to a channel encoder, which adds a number of error check bits to them. In the above-mentioned GSM full-rate transmission channel, for example, error check bits with a transmission rate of 9.8 kbit/s are added to speech coding bits of 13 kbit/s on the transmission channel, whereby the total transmission rate of the speech signal on the channel will be 22.8 kbit/s. The channel decoder decodes the channel encoding in the receiver in such a way that only the 13 kbit/s bit stream produced by the speech encoder is applied to the speech decoder. During channel decoding, the channel decoder detects and/or corrects errors that have occurred on the channel as far as such error correction is possible.

Speech coding and channel coding are closely connected with each other in telecommunications systems transmitting speech. The significance of the bits produced by the speech encoder for the quality of speech generally varies so that in some cases one error in an important bit may cause audible noise in the synthesized voice, whereas a larger number of errors in less important bits may be almost imperceptible. How big the differences between the importance of speech coding bits are depends essentially on the speech coding method employed; however, at least small differences can be found in most methods. When a speech transmission method is developed for a telecommunications system, channel coding is therefore usually designed together with speech coding in such a manner that the bits that are the most important for the quality of speech are protected more carefully than less important bits. On a full-rate channel of the GSM system, for instance, the bits produced by the speech encoder are divided into three different categories according to their importance. The most important category is protected in channel coding with both an error-detecting and an error-correcting code; the second most important category is protected only with an error-detecting code; the least important category is not protected at all in channel coding.

Although the speech coding and channel coding are closely connected, there are often considerable differences in their implementation in digital mobile telephone networks. The GSM system may once again be used as an example. Speech encoding and speech decoding are typically carried out by means of software, using a digital signal processor. This applies both to terminal equipment (telephones) and to network elements. Channel coding may also be performed by means of software, but often a separate integrated circuit is designed for this purpose, especially at the network end. Thus, changing of the speech coding method requires often merely a new signal processing program, whereas changing of the channel coding method may require equipment changes.

In addition to the way they are implemented, these two codings, speech coding and channel coding, may differ in their physical locations at the network end of a mobile telephone system. In the GSM system, for example, channel coding in the network is performed in a base station, while speech coding is performed in a separate transcoder unit, which may be remote from the base station, and even if it is located at the base station, it is a completely separate unit. Because of the separate locations, any changes in the transmission rates of the channel coding and speech coding will also entail changes in the connections between the different network elements.

In view of the different ways in which speech and channel coding are performed and their separate locations, it would be clearly more advantageous if the quality of speech could be improved in an existing system merely by changing the speech coding. As the channel coding is, however, usually designed particularly for the speech coding of the existing system, and as the new speech coding method should use exactly the same transmission rate as the original speech coding method of the system, methods for adapting new speech coding methods for existing telecommunications systems have not been disclosed previously.

FIG. 1A and 1B are block diagrams illustrating a transmitter and a receiver of a prior art telecommunications system. In the transmitter shown in FIG. 1A, a speech signal 100 is supplied to a speech encoder 101, which on the basis of the signal generates compressed speech coding bits having a transmission rate of S kbit/s. These speech coding bits are supplied to a channel encoder 102, where error check bits are added to them, which results in a total transmission rate of S+C kbit/s. This bit stream 103 is transmitted over the transmission channel to the receiver shown in FIG. 1B. In the receiver of FIG. 1B, the bit stream 104 received from the transmitter is at first supplied to a channel decoder 105, which decodes the channel encoding and transmits the speech coding bits thus obtained to a speech decoder 106; the transmission rate of the speech coding bits is again S kbit/s. The speech decoder synthesizes a digital speech signal 107. The telecommunications systems of the prior art thus employ only one speech encoding method and a corresponding channel coding method. Such telecommunications systems include, for example, all the commonest digital mobile telephone systems.

The prior art systems also include systems in which two different speech coding methods are used in such a manner that a separate channel coding method corresponds to each speech coding method, and in which the total transmission rate obtained as a result of the speech and channel coding is different in these two methods. An example of such a system is the GSM mobile telephone system, in which full-rate and half-rate traffic channels are specified.

There are also known solutions in which transmitters and receivers according to FIG. 1A and 1B are connected in parallel so that the system that is formed comprises several different speech encoding methods, each of which has a corresponding channel coding method. The speech coding methods used in such a system can operate at different transmission rates, wherefore the channel coding methods corresponding to them are also mutually independent and operate at different transmission rates.

SUMMARY OF THE INVENTION

The object of the present invention is to provide a digital telecommunications system in which several different speech coding methods operating at different transmission rates are used for transmitting speech.

An object of the invention is a method and apparatus which allow the transmission of speech in a digital telecommunications system by the use of several different speech coding methods operating at different transmission rates.

Another object of the invention is a method for adapting more advanced speech coding methods operating at lower transmission rates for an existing digital telecommunications system using a certain speech coding method.

Still another object of the invention is a method for allowing addition of new speech coding methods to a digital telecommunications system without changing the channel coding method originally used.

Yet a further object of the invention is a method for allowing addition of new speech coding methods to an existing digital telecommunications system in such a manner that the addition causes as small changes as possible in the telecommunications system.

This is achieved with a method of the type described in the foregoing BACKGROUND section, which according to the invention is characterized by using in the transmission of the speech N different speech coding methods, all of which operate at different transmission rates S1, S2, . . . , and SN kbit/s, respectively, where $N \geq 2$ and $S1 \geq S2 \geq \ldots \geq SN$, employing with each speech coding method a first channel encoding method specific for the respective speech coding method, the first channel encoding method comprising adding error-detecting and error-correcting first channel coding bits to the speech coding bits, and producing a constant transmission rate S1 independent of the speech coding method employed so that the transmission rate of the first channel coding bits added to the speech coding bits during the first channel encoding is, depending on the speech coding method employed, 0, S1–S2, . . . , S1–SN kbit/s, respectively, after the first channel encoding, performing a second channel encoding, in which error-detecting and error-correcting second channel coding bits are added to the signal generated by the first channel encoding, the transmission rate of the second channel coding bits being C kbit/s, whereby after the second channel encoding the total transmission rate is a constant S1+C kbit/s irrespective of the selected speech encoding method.

The invention also relates to a transmitter apparatus for a telecommunications system transmitting digital speech, the apparatus comprising speech encoding means for coding a speech signal by a speech coding method, channel encoding means for channel-encoding the speech-encoded signal to a signal whose transmission rate is equal to the total transmission rate on the transmission channel. The transmitter apparatus is characterized according to the invention in that the speech encoding means employ two or more speech coding methods, which provide speech-encoded signals having mutually different transmission rates, the channel encoding performed by the channel encoding means consists of two steps comprising first channel encodings which are specific for each speech encoding method and which, from the encoded speech signals having different transmission rates, generate first channel-encoded signals having the same constant transmission rate which is independent of the speech coding method, and a second channel encoding which is independent of the speech coding method and which, from a selected first channel-encoded signal, generates a second channel-encoded signal having a constant transmission rate which is independent of the speech coding method and which is the same as said total transmission rate.

The invention further relates to a receiver apparatus in a telecommunications system transmitting digital speech, comprising channel decoding means for decoding a received channel-encoded speech signal, speech decoding means for speech-decoding a channel-decoded speech signal by a speech coding method. The receiver apparatus is characterized according to the invention in that the speech decoding means employ two or more speech decoding methods for decoding speech-encoded speech signals produced by two or more speech encoding methods and having mutually different transmission rates, the channel decoding performed by the channel decoding means consists of two steps comprising a second channel decoding which is independent of the speech coding method and which, from the received channel-encoded speech signal whose constant transmission rate, which is independent of the speech coding method, is the same as the total transmission rate used in the telecommunications channel, produces a first signal having a lower constant transmission rate which is independent of the speech coding method, first channel decodings which are specific for each speech coding method and which channel-decode the first signal, producing encoded speech signals which are specific for each speech coding method and which have mutually different transmission rates.

According to the invention, speech transmission in a digital telecommunications system employs several different speech coding methods, which may all operate at different transmission rates in such a manner that the total transmission rate obtained as a result of speech coding and channel coding remains the same irrespective of the transmission rate of the speech coding method employed. The method is based on the use of two-part channel coding. The first channel coding is dependent on the speech encoding method and is performed in connection with speech coding in such a way that the total transmission rate provided by the speech encoding and the first channel encoding is always constant irrespective of the speech coding method used. The second channel encoding, subsequently performed, is always exactly the same regardless of the speech encoding method and the first channel encoding method, and it is used with all speech encoding methods. The second channel coding may be, for example, the channel coding originally used in an existing telecommunications system, e.g. channel coding according to the recommendations of the GSM system. In this case, the first channel coding is not used in connection with the speech coding method originally employed in the telecommunications system; in other words, the transmission rate of the first channel coding bits, provided by the first channel encoding, is 0. The first channel coding methods used in connection with speech encoding methods that have been added later and operate at a lower rate provide the same total transmission rate as the original speech encoding method. The new speech encoding methods can thus be added to an existing telecommunications system without changing the channel coding method originally employed. The invention thus allows the quality of voice in an existing system to be improved with as small changes as possible.

The invention differs essentially from, e.g., the GSM system, in which full-rate and half-rate channels are specified, since the invention allows the use of several speech encoding methods in a telecommunications system in such a manner that the total transmission rate used by the speech and channel coding is constant irrespective of the speech encoding method employed. As regards the present invention, the known full-rate and half-rate transmission channels form separate systems, and the invention can be implemented independently in both transmission channels.

The speech coding method employed on each connection and the first channel coding method associated with it can be selected in many different ways, e.g. manually by the user, automatically on the basis of the erroneousness of the transmission path or on the basis of signalling between the transmitter and the receiver.

The method of the invention is thus based on the use of first channel coding in such a manner that a constant transmission rate is obtained as a result of speech encoding and the first channel encoding; a new speech coding method can be adapted for an existing system without changing the originally used second channel coding method. It is particularly characteristic of the invention that, when it is applied to an existing system, all speech coding methods have a common second channel encoder, whereas a separate first channel coding method is associated with each speech coding method in such a way that one speech encoder is not provided with any kind of first channel encoder.

The invention can be implemented in such a way that the first channel encoding is performed in connection with speech encoding, whereby the originally used channel coding unit, which performs the second channel coding, can be retained unchanged. In the GSM mobile telephone network, for example, the first channel coding can be carried out by means of software in a transcoder unit together with the new speech coding method, in which case no other changes are required at the fixed network end. In a terminal equipment (telephone), the new speech coding method and the corresponding first channel coding method can be implemented using the signal processor of the telephone in the same way as in the originally used speech coding.

BRIEF DESCRIPTION OF THE DRAWINGS

In the following, the invention will be described in greater detail by means of preferred embodiments with reference to the accompanying drawings, in which.

DETAILED DESCRIPTION OF PREFERRED EMBODIMENTS OF THE INVENTION

The present invention is particularly suitable for telecommunications systems in which channel coding is particularly significant. The main field of application of the invention is wireless speech transmission, e.g. in digital mobile telephone systems. A particularly important field of application for the invention is the GSM mobile telephone system and its derivatives which are similar to the GSM as regards speech coding and channel coding but which may differ from the GSM for instance in their operating frequency ranges, such as the DCS-1800 and DCS-1900 systems.

As stated above, speech transmission in a digital telecommunications system of the invention employs several different speech coding methods which do not all operate at the same transmission rate. A first channel coding method is assigned to each speech coding method in such a way that the total transmission rate obtained as a result of speech coding and channel coding is kept constant regardless of the transmission rate of the speech coding method employed. The second part of channel coding is always exactly the same irrespective of which speech coding method and first channel coding method are used.

Figure 1A:
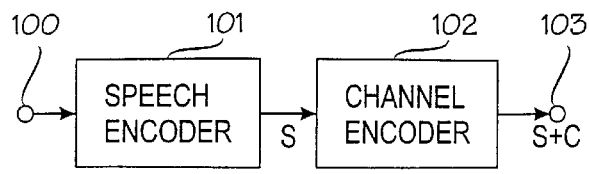
FIG. 1A and FIG. 1B illustrate a transmitter and a receiver of the prior art, respectively.
Figure 1B:
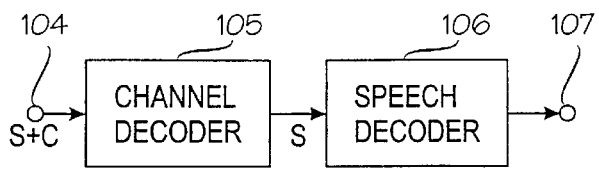
Figure 2:
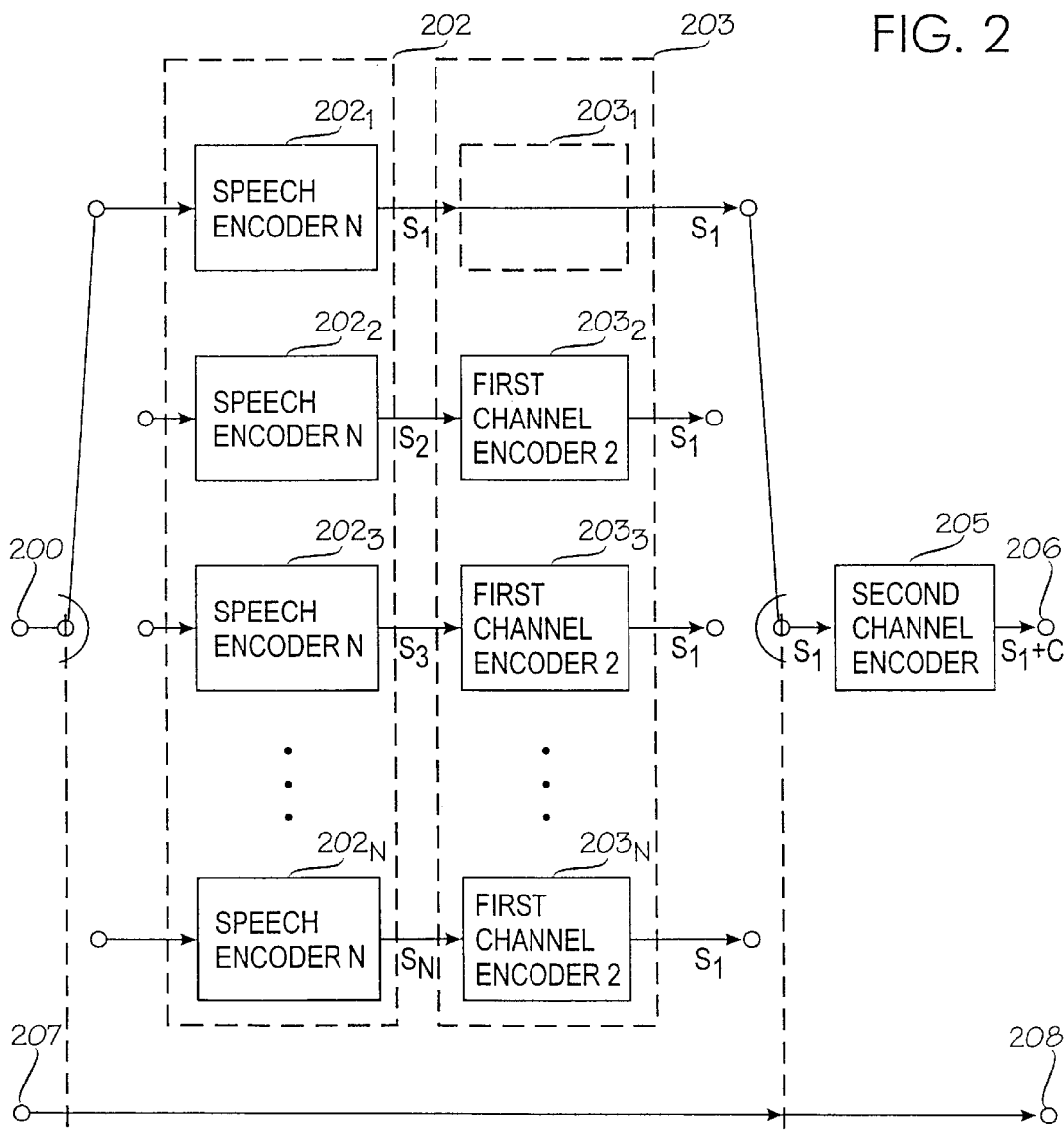
FIG. 2 is a block diagram of a transmitter in a telecommunications system according to the invention.

FIG. 2 is a block diagram of a transmitter in a telecommunications system according to the invention. The transmitter comprises N parallel speech encoders $202_1$–$202_N$; the transmission rates of the compressed speech signals generated by these encoders, i.e. of the speech coding bits, are $S_1$, $S_2$. . . , $S_N$ kbit/s, respectively (for reasons of clarity, the unit kbit/s for the transmission rate will be omitted below). A digital speech signal 200 to be transmitted is supplied to an input switch 201, which is used to select one of these N speech encoders 202 for each speech connection. In the embodiment illustrated in FIG. 2, the invention is applied in such a way that new, more advanced speech coding methods are added to an existing system. Therefore the speech encoder $202_1$ in Figure 1A employs a speech coding method that has originally been used in the existing telecommunications system and that provides a transmission rate of $S_1$ for the speech coding bits, which is the same as the transmission rate of speech coding bits used originally in the existing telecommunications system. In the transmitter, it is thus also possible to select N−1 other speech encoders $202_2$–$202_N$, which provide transmission rates of $S_2$, $S_3$ ,. . . $S_N$, respectively, where the total number of speech encoders is $N \geq 2$. The transmission rates of the speech encoders have the following relationship: $S_1 \geq S_2 \geq S_3 \geq . . . \geq S_N$, where $S_1 \geq S_N$ must be true. The transmission rates of speech coding bits used by the speech encoders added to the telecommunications system may thus be, for some of the speech encoders $202_2$–$202_N$ the same as the transmission rate $S_1$, originally used for speech coding bits in the telecommunications system; but at least for one speech encoder this transmission rate is lower than the transmission rate $S_1$ originally used. Each speech encoder $202_1$–$202_N$ is used with a channel encoder $203_1$–$203_N$ specific for the respective speech coding method; however, in the case of those speech encoders which provide a transmission rate of $S_1$ for the speech coding bits, the first channel encoder 203 does not affect the speech coding bits in any way but forwards them as such to the second channel encoder 205. In this case, the transmission rate provided by the first channel encoder for the channel coding bits, is thus 0, and the transmission rate to the second channel encoder 205 is $S_1$. In other words, the first channel encoder 203 is, in fact, omitted from this embodiment, like the first speech encoder $202_1$ in FIG. 2, corresponding to the speech coder 202 originally used. A first channel coding bit rate equal to that of the first channel encoder $203_2$–$203_N$ may also be provided by another speech encoder $202_2$–$202_N$, if the speech coding bit rate of the respective speech encoder is $S_1$. In other cases, the first channel encoder $203_2$–$203_N$ adds error correction bits to the bit stream generated by the corresponding speech encoder $202_2$–$202_N$ so that the total transmission rate provided by the speech encoding and the first channel encoding is $S_1$ irrespective of the speech encoding method used. The channel coding bit rate provided by the first channel encoders $203_1$–$203_N$ is thus correspondingly 0, $S_1$–$S_2$, $S_1$–$S_3$, . . . , $S_1$–$S_N$, depending on the speech encoding method employed by the speech encoder $202_1$–$202_N$ connected in series before them. It is characteristic of the invention that there is at least one speech encoding method whose respective first channel encoder 203 provides a first channel coding bit rate higher than 0. From the first channel encoder $203_1$–$203_N$ selected for the speech connection, the speech coding bits and the first channel coding bits are supplied via a switch 204 to a second channel encoder 205. In the transmitter according to the invention, the transmission rate of the bit stream to be transmitted to the second channel encoder 205 is thus a constant $S_1$ kbit/s. The second channel encoder adds error correction bits to the bit stream produced by the selected speech encoder 202 and the first channel encoder 203 so that, at the output 206 of the second channel encoder, the total transmission rate is a constant $S_1$+C kbit/s. The switches 201 and 204 are controlled synchronically by a control signal 207 so that they will select the series connection of the speech encoder 202 which implements the desired speech encoding method, and the respective first channel encoder 203. Information on the selected speech coding method is also sent to the transmission channel in a signal 208 to enable the receiver to select the correct first channel decoding and speech decoding methods corresponding to the speech encoding and first channel encoding methods used.

Figure 3:
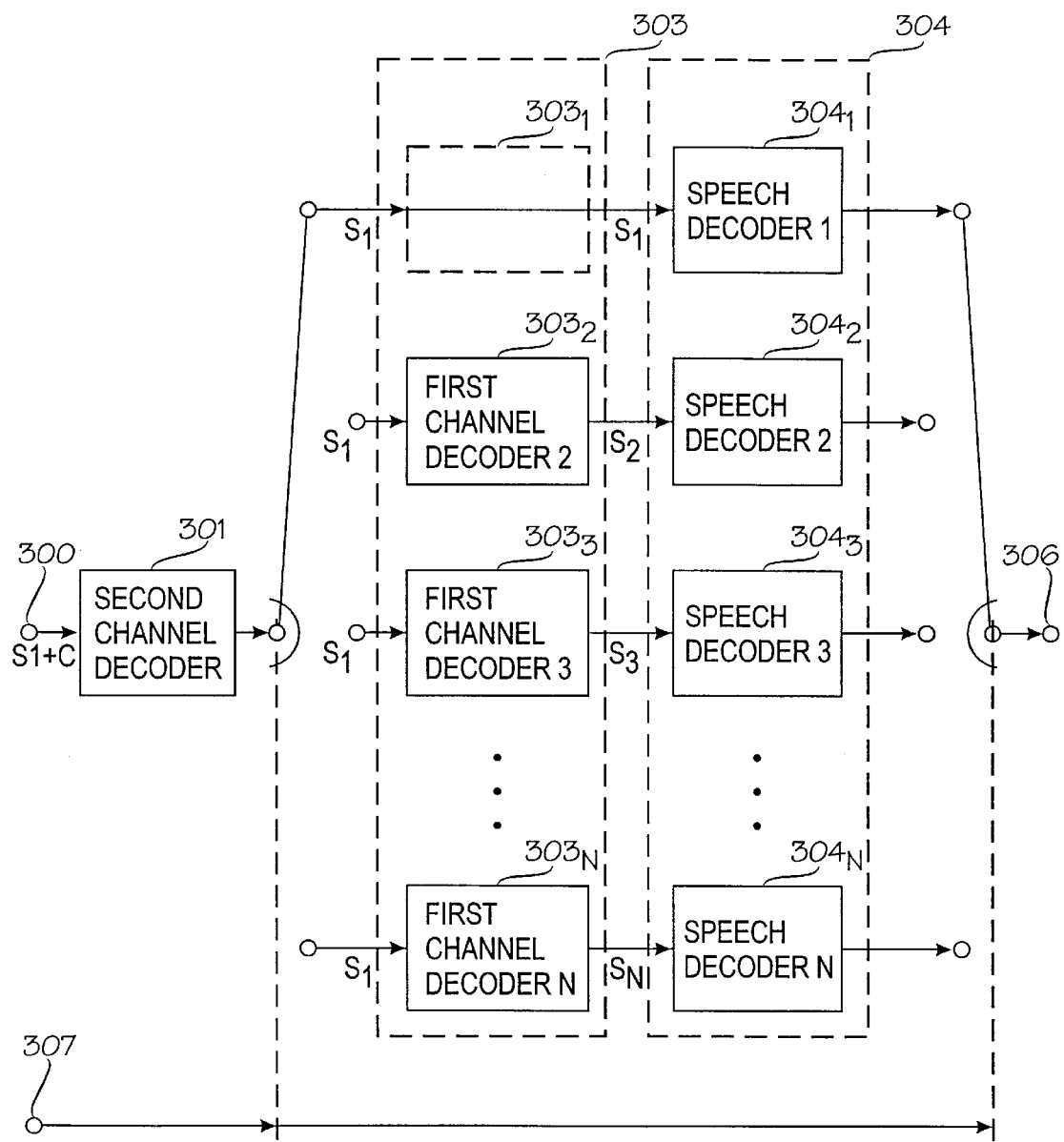
FIG. 3 is block diagram of a receiver in a telecommunications system according to the invention.

FIG. 3 is a block diagram of a receiver in a telecommunications system according to the invention. The receiver comprises a second channel decoder 301, a selection switch 302, N parallel first channel decoders $303_1$–$303_N$, N parallel speech decoders $304_1$–$304_N$, and a selection switch 305. The receiver receives the speech coding bits and the first and second channel coding bits from the transmitter through the transmission channel at the input 300 of the second channel decoder 301. The second channel decoder 301 decodes the second channel encoding performed by the second channel encoder 205 of the transmitter shown in FIG. 2; as a result of this, the transmission rate of the bit stream received at the input 300 decreases from the constant $S_1$+C to the constant $S_1$. The second channel decoder 301 is thus independent of the speech coding method used and always performs the same channel decoding. The bit stream from the output of the second channel decoder 301, having the transmission rate of $S_1$, is supplied to the selection switch 302. The selection switch 302 switches the output of the second channel decoder 301 to one of N first channel decoders $303_1$–$303_N$, depending on the speech coding method used. The receiver also receives a signal 307 from the transmitter, through the transmission channel. Signal 307 corresponds to signal 208 of FIG. 2 and gives information on the speech coding method employed on the speech connection; the state of switch 302 and also that of switch 305 are determined on the basis of this information. The first channel decoder 303 is always dependent on the speech coding method employed, and it is connected in series with the speech decoder 304 assigned to it. The first channel decoder 303 decodes the first channel encoding performed by the first channel encoder 203 of the transmitter shown in FIG. 2 and provides the transmission rate used by the selected speech coding method. If the transmission rate of the channel coding bits added by the first channel encoding is 0, as in the case of channel encoder $203_1$ in FIG. 2, the respective first channel decoder feeds the bits received from the second channel decoder 301, the transmission rate of said bits being $S_1$, directly to the associated speech decoder; thus, in fact, there is no first channel decoder for such a speech coding method. In FIG. 3, first channel decoder 303$_1$—corresponding to the missing first channel encoder 203$_1$ of FIG. 2 —is omitted. Naturally only one of the channel decoders is in use at a time. The other first channel decoders 303$_2$–303$_N$ of FIG. 3 decode the channel encoding associated with the speech encoders 202$_2$–202$_N$ of FIG. 2 and thus decrease the constant transmission rate $S_1$ of the bit stream received from the second channel decoder 301 by the transmission rate $0, S_1-S_2, S_1-S_3, \ldots, S_1-S_N$, providing the transmission rates $S_1, S_2, \ldots, S_N$ kbit/s, which are dependent on the speech coding methods. The bit stream generated by the first channel decoder 303$_1$–303$_N$ is supplied to the corresponding speech decoder 304$_1$–304$_4$, which by means of the received speech coding bits generates a synthesized speech signal. The output signal of the speech decoder of the selected speech coding method is switched by selection switch 305 to the output 306 of the receiver. The position of the selection switch 305 is determined on the basis of signal 307 received from the transmitter through the transmission channel.

In the embodiment of the invention illustrated in FIGS. 2 and 3, information on the speech coding method employed is forwarded through the transmission channel from the transmitter to the receiver. This information transfer may be based on any suitable method, e.g. a signalling method known per se. The speech coding method may also be permanent at each receiver or transmitter. It is, however, essential that both the transmitter and the receiver have information on the speech coding method employed so that the positions of the switches 201, 204, 302 and 305 can be determined correctly, and the same speech coding method can be selected both in the transmitter and in the receiver.

There are several ways of selecting the speech coding method according to the invention for each speech connection. Some factors influencing the selection and a few selection method will be described in the following; however, the invention is not limited to these examples.

If the transmission rate used for transmitting the speech coding bits is as low as possible in the selected speech coding method, more bits are left for the first channel coding. In this case, the performance of the system will be improved in an erroneous channel, but, on the other hand, it may be decreased in an error-free channel, where it would be advantageous to use as much capacity as possible for speech coding. To classify speech coding methods as error-tolerant methods and methods suitable for a high-quality transmission channel according to the transmission rate is a very coarse simplification, because transmission rate is not the only significant factor. In this connection, however, such a classification will clarify the selection of the speech coding method. According to one embodiment of the invention, the speech coding method is selected according to the erroneousness of the transmission channel: in the case of a high quality transmission channel, a speech coding method is selected in which a major part of the transmission channel capacity is used for speech coding, i.e. the speech coding has a high transmission rate; in the case of a poor quality transmission channel, a speech coding method is selected in which the first channel coding is emphasized more, i.e. the speech coding method has a low transmission rate. The selection can be made by monitoring the quality/erroneousness of the transmission channel when the connection is established. Since the quality of a transmission channel may vary to a great extent during a speech connection, the quality/erroneousness can also be monitored during the speech connection, and if necessary, the speech coding method can be changed.

One of the most significant advantages of the present invention is that it allows new speech coding methods to be added to an existing telecommunications system. In such a case, it is essential that the transmitters and receivers using the new speech coding methods still operate together with the transmitters and receivers which have originally been used in the telecommunications system and in which these new speech coding methods have not been implemented. A telecommunications system of this kind typically comprises various transmitters and receivers which do not employ a uniform group of speech coding methods. However, all transmitters and receivers must be able to use at least one speech coding method which is common to all of them. If, for example, the new system of the invention is provided by planning and realizing a new speech coding method for use on a full-rate GSM transmission channel, the new GSM system will comprise telephones and network elements provided with both the new speech coding method and the method currently in use in the GSM system (i.e. new equipments). In addition, the system will also comprise equipments which have already been used previously and which are provided only with the current speech coding method according to the GSM system (i.e. old equipments). When a new and an old equipment communicate with each other, the speech coding method selected must be the current GSM method, which can be selected in both equipments. Another factor influencing the selection is thus a heterogeneous group of equipments: the speech coding method selected at the beginning of a connection is the most suitable speech coding method which can be selected both in the transmitter and in the receiver. Even in this case, it may be necessary to change the speech coding method during the connection, as the transmitter and receiver may also be changed during one speech connection.

In the description of the invention, it has been stated that the channel encoder 203, 205 adds error check bits to the speech coding bits. The channel encoder 203, 205 can, in fact, operate in practice so that the error check bits are added to the speech coding bits generated by the speech encoder in such a manner that the speech coding bits are still visible and unchanged in the resulting bit error which now also includes the channel coding bits. Depending on the channel coding method, the channel encoder 203, 205 may also operate so that even the speech coding bits are changed when error check bits are added. In this case, the channel decoder 301, 303 restores the speech coding bits at channel decoding if the number of errors received from the channel does not exceed the error correction capability of the channel coding. In view of the present invention, there is no difference between these two methods, and the expression "the channel encoder adds error check bits to the speech coding bits" refers to both these cases, since, from the point of view of speech coding and the transmission rate, this is exactly what happens.

In a telecommunications system, a speech signal is often also subjected to other operations, such as encryption, interleaving of the bits to be transmitted (closely connected with channel coding), a possible precoding associated with the modulation method, or bit interleaving in association with spectral shaping of the signal; however, these methods are irrelevant to the present invention. In the present invention, channel coding refers particularly to the use of error-detecting and error-correcting codes. Depending on how the channel coding is implemented, the channel decoder may have available data on the results of demodulation so that it may utilize data on the error probabilities of individual bits, i.e. the so-called soft decisions of the demodulator. It is not relevant to the invention whether soft decisions are available or not, and the channel decoder of the invention covers both cases. In typical implementations, the second channel decoder 301 of the invention has the results of soft decisions available, whereas the first channel decoder 303 does not, but the system of the invention may also be implemented in some other way.

The following is a simple general example of how a new speech coding method is added to a full-rate transmission channel of the GSM mobile telephone system for use in conjunction with the RPE-LTP speech coding method presently in use. The example is given merely to illustrate the invention; it is thus only one possible embodiment, and the invention is not limited to it. In an RPE-LTP speech coding method, a speech signal is divided into frames of 20 ms, of each of which an RPE-LTP speech encoder forms 260 speech coding bits, whereby the transmission rate of the speech coding bits is 13 kbit/s. The channel encoder used on a full-rate GSM speech channel, i.e. the second channel encoder in the system of the invention, adds 196 error coding bits to 260 speech coding bits; the total bit number in one 20 ms frame is thus 456 bits, which corresponds to a total transmission rate of 22.8 kbit/s. In this example, a technically highly advanced speech coding method in which the transmission rate of speech coding bits is 8 kbit/s and the speech signal is divided into frames of 10 ms, each containing 80 bits, is added to a full-rate GSM speech channel. To implement the invention, a first channel coding method must be designed for this speech coding method. A simple exemplary solution for a first channel coding method consists of the following operations, which are described from the point of view of the first channel encoder:

(a) Two speech frames of 80 bits are combined in the first channel encoder into one frame of 160 bits.

(b) 100 error-correcting bits are added to these 160 bits by an error-correcting code known per se. The selection of the code is influenced by both the 8 kbit/s speech coding method employed and the channel coding method of the full-rate GSM channel. This results in a 260-bit speech frame according to a full-rate GSM channel.

(c) The 260 bits generated are classified into three groups according to their importance in view of the channel coding of the full-rate GSM channel.

Thereafter the speech coding bits and the first channel coding bits are supplied to the second channel encoder, which is identical with the channel encoder used in connection with the RPE-LTP. In the receiver, the first channel decoder decodes the first channel encoding.

The figures and the description associated with them are intended merely to illustrate the present invention. In their details, the method, receiver and transmitter of the invention may vary within the scope of the appended claims.

We claim:

1. A method for speech transmission of a speech in a telecommunications system, said method comprising the steps of:

compressing a speech signal of the speech to a small number of speech coding bits by speech coding method, channel encoding the speech coding bits, and using, in transmitting the speech as a transmitted signal by a transmitter, N different speech coding methods, all of which operate at different transmission rates S1, S2, . . . , and SN kbit/s, respectively, where N≧2 and S1 ≧S2≧. . . ≧SN, including:

employing with each speech coding method a first channel encoding method specific for the respective said speech coding method, said first channel encoding method comprising adding error-detecting and error-correcting first channel coding bits to the speech coding bits, and producing a constant transmission rate S1 which is independent of the speech coding method employed, so that the transmission rate of the first channel coding bits added to the speech coding bits during the first channel encoding its, depending on the speech coding method employed, 0 S1–S2, . . . , S1–SN kbit/s, respectively, and after the first channel encoding, performing a second channel encoding, in which error-detecting and error-correcting second channel coding bits are added to the signal generated by the first channel encoding, the transmission rate of said second channel coding bits being C kbit/s, whereby, after the second channel encoding, the total transmission rate is a constant S1+C kbit/s irrespective of the selected speech encoding method.

2. The method according to claim 1, further including:

receiving the transmitted signal, including:

performing a second channel decoding for removing the second channel coding bits, which were added by the second channel encoding and the transmission rate of which is C kbit/s, and performing, after the second channel decoding, a first channel decoding for removing the first channel coding bits added by the first channel encoding, in such a manner that, depending on the speech coding method employed, a transmission rate of S1, S2, . . . , SN kbit/s, respectively, is provided for the speech coding bits to be supplied to the speech decoding.

3. The method according to claim 1 or 2, further comprising:

classifying the bits supplied to the second channel coding into several groups according to their importance for error protection in the speech coding method employed, in such a manner that the error correction capability of the second channel coding is directed to the bits that are the most important for each speech coding method and the first channel coding method employed in conjunction with the respective speech coding method.

4. The method according to claim 1 or 2, wherein:

when a speech connection is established, the speech coding method employed is selected according to the erroneousness of the transmission path in such a way that the more there are transmission errors on the transmission channel, the lower is the transmission rate of the speech coding bits to the first channel encoding from the selected speech coding method, and the higher is the transmission rate of the first channel coding bits.

5. The method according to claim 4, further comprising:

changing the speech coding method during the speech connection when the erroneousness of the transmission path changes in such a way that the more there are transmission errors on the transmission path, the lower is the transmission rate of the speech coding bits supplied to the first channel encoding from the selected speech coding method.

6. The method according to claim 1 or 2, in an instance wherein:

a corresponding speech decoding method cannot be selected in all receivers of a plurality of receivers for all the speech coding methods that can be selected in the transmitter, and a corresponding speech coding method cannot be selected in all transmitters of a plurality of transmitters for all the speech decoding methods that can be selected in the different receivers, and said method further comprising:

when a speech connection is established, the speech coding method employed is selected by means of signalling between the respective transmitter and the respective receiver so that the speech coding method selected is a speech coding method which can be selected both in the respective transmitter and in the respective receiver.

7. The method according to claim 1 or 2, in an instance wherein:

a corresponding speech decoding method cannot be selected in all receivers of a plurality of receivers for all the speech coding method which can be selected in all transmitters of a plurality of transmitters, and a corresponding speech coding method cannot be selected in all of the transmitters for all the speech decoding methods which can be selected in all of the receivers, and said method further comprising:

manually selecting the speech coding method employed before a speech connection is established in such a way that the speech coding method selected is a speech coding method which can be selected both in the respective transmitter and in the respective receiver.

8. The method according to claim 1, further comprising:

carrying out the first channel encoding in more than one step, and the second channel encoding being the same in the case of all speech coding methods.

9. A transmitter apparatus for a telecommunications system transmitting digital speech on a transmission channel, said apparatus comprising:

speech means for coding a speech signal by a speech coding method to provide a speech encoded signal, channel encoding means for channel-encoding the speech-encoded signal to a signal whose transmission rate is equal to a total transmission rate on the transmission channel, the speech encoding means employing two or more speech coding methods, which provide speech-encoded signals have mutually different transmission rates (S1, S2, . . . , SN), the channel encoding means being arranged to provide the channel encoding in two steps comprising first channel encodings which are specific for each speech encoding method and which, from the encoded speech signals having different transmission rates, generate first channel-encoded signals having a same constant transmission rate (S1) which is independent of the speech coding method, and a second channel encoding which is independent of the speech coding method and which, from a selected first channel-encoded signal, generates a second channel-encoded signal having a constant transmission rate (S1+C) which is independent of the speech coding method and which is the same as said total transmission rate.

10. The transmitter apparatus according to claim 9, comprising:

means for selecting the speech encoding method and the first channel encoding, and for switching the signal produced by the selected speech encoding method and first channel encoding to the second channel encoding.

11. The method according to claim 10, wherein:

said means for selecting are arranged to be controlled on the basis of the erroneousness of the transmission path, or on the basis of signalling between the transmitter apparatus and a receiver apparatus, or manually.

12. A receiver apparatus in a telecommunications system transmitting digital speech on a telecommunications channel at a total transmission rate, comprising:

channel decoding means for decoding a received channel-coded speech signal, speech decoding means for speech-decoding a channel-decoded speech signal by a speech decoding method, the channel decoding means being arranged to provide channel decoding two steps comprising:

a second channel decoding which is independent of the speech coding method and which, from said received channel-encoded speech signal, sharing a constant transmission rate (S1+C), which is independent of the speech coding method and is the same as the total transmission rate used in the telecommunications channel, produces a first signal having a lower constant transmission rate (S1) which is independent of the speech coding method, and first channel decodings which are specific for each speech coding method and which channel-decode said first signal, producing encoded speech signals which are specific for each speech coding method and which have mutually different transmission rates (S1, S2, . . . , S3), and the speech decoding means employ two or more speech decoding methods for decoding said speech-coded speech signals produced by two or more speech encoding methods and having mutually different transmission rates (S1, S2, . . . , SN).

13. The receiver apparatus according to claim 12, comprising:

means for selecting the speech decoding method employed and the first channel decoding specific for the selected speech decoding method, and for switching the signal produced by the second channel decoding (301) to the selected speech decoding method and selected first channel decoding method.

14. The receiver apparatus according to claim 13, wherein:

the selection means are arranged to be controlled on the basis of the erroneousness of the transmission path, or on the basis of signalling between a transmitter apparatus and the receiver apparatus, or manually.

* * * * *